Aug. 24, 1926.
G. E. HULSE
1,597,315
GENERATOR REGULATION
Filed May 7, 1923
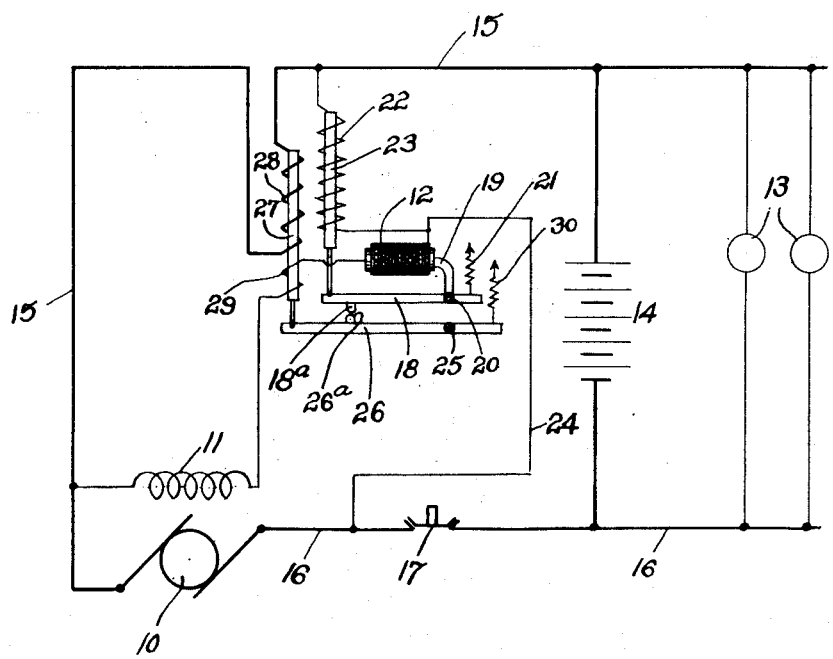
George E. Hulse INVENTOR
BY Robert S. Blair
his ATTORNEY Patented Aug. 24, 1926.

1,597,315

UNITED STATES PATENT OFFICE.

GEORGE E. HULSE, OF NEW HAVEN, CONNECTICUT, ASSIGNOR TO THE SAFETY CAR HEATING & LIGHTING COMPANY, A CORPORATION OF NEW JERSEY.

GENERATOR REGULATION.

Application filed May 7, 1923. Serial No. 637,073.

This invention relates to systems of regulation for generators, particularly of the direct current type, operated under conditions of variable speed. One of the objects thereof is to provide a system for regulating the output of a generator in predetermined manner for highly efficient operation throughout its range of speed. Another object is to provide apparatus of the above character simple and effective and reliable in operation. Another object is to provide apparatus of the above nature adapted to guard the generator from harm when operating at high speeds. Another object is to provide such apparatus adapted to regulate the operation of a generator in such manner that its maximum output occurs at times when the generator is free from danger of harm therefrom. Another object is to provide a simple and practical art whereby regulation of the above nature may be reliably and conveniently carried on. Other objects will be in part obvious or in part pointed out hereinafter.

The invention accordingly consists in the features of construction, combinations of elements, arrangements of parts and in the several steps and relation and order of each of the same to one or more of the others all as will be illustratively described herein, and the scope of the application of which will be indicated in the following claims.

In the accompanying drawing there is represented diagrammatically a circuit and coacting apparatus showing one of the various possible embodiments of this invention.

Referring now to this drawing in detail, there is shown a generator 10, which may be driven from a car axle for example, having a shunt field winding 11 in which is serially connected a variable resistance element 12 preferably of the carbon disk type, the resistance of which varies with the pressure with which it is compressed. The generator 10 provides current for a suitable translation circuit which may, for example, take the form of a lamp load 13 and a storage battery 14 bridged across the generator mains 15 and 16 connected respectively to the terminals of the generator 10. An automatic switch, diagrammatically indicated at 17 and conveniently inserted in one of the generator mains, as the main 16, is adapted to connect the generator 10 to the translation circuit upon the attainment by the generator of a suitable working voltage. This automatic switch 17 also acts in reverse manner to disconnect the generator 10 from the translation circuit when its voltage is insufficiently high to supply the translation circuit, the storage battery 14 acting when this takes place to supply current to the load, such as the lamps 13.

Associated with the variable resistance 12 is a bell crank lever 18—19 pivoted as at 20, one arm 19 of which operates upon the one end of the carbon pile 12 to vary the pressure thereon. A spring 21, conveniently connected at one end to the arm 18 of the bell crank lever 18—19, tends to maintain the carbon pile 12 under compression while a voltage-responsive coil 22, acting upon the core 23 connected to the other end of the arm 18, opposes the action of the spring 21 and when energized to a suitable degree, as will be more clearly hereinafter set forth, acts to relieve and vary the pressure upon the carbon pile 12. The coil 22 is, as above noted, voltage responsive and has its one terminal connected to the generator main 15 and its other terminal connected, as by the conductor 24, to the other generator main 16, and upon the generator side of the automatic switch 17.

Adjacent the bell crank lever 18—19 and underneath the arm 18 thereof, as diagrammatically illustrated in the drawing, is pivoted at 25 a lever 26 having connected thereto at one end a core 27 upon which are active a current coil 28 preferably inserted in the generator main 15 and a second coil 29 connected serially with the field winding 11 and the carbon pile 12, it being noted that the conductor 24 conveniently serves to complete this series circuit. A spring 30 connected preferably at the other end of the lever 26 opposes the action of the coils 28 and 29 upon the core 27. The arm 18 of the bell crank lever 18—19 is provided with a lug 18$^a$ in substantial alignment with a lug 26$^a$ on the lever 26, so that the movement of the lever 26 about its pivot 25 in response to the action of the coils 28 and 29 may be transmitted through these lugs, which thus become interengaged, to the carbon pile 12.

The current coil 28 and the coil 29 are so related to one another that their respective magnetic effects are opposed to one another and so that the resultant pull on the core 27 is due to the differential action therebetween. The coil 28, shown illustratively as carrying the total current output of the generator, tends normally to maintain, during certain periods of the action of the apparatus, a substantially constant current output of the generator. The coil 29, however, being included in the field circuit, acts to cause a departure from the condition of constant current output in accordance with the instantaneous speed of the generator, as will be more clearly hereinafter set forth.

In considering now more in detail the action of the apparatus, it may first be pointed out that the generator 10, if driven from a car axle, is subjected to variations in speed throughout relatively wide ranges. Depending upon the conditions in the translation circuit, the generator may be called upon to supply substantially its full output at any time and irrespective of the speed at which it may at that time be operated. When operating at high speeds, however, it is highly desirable that the output of the generator be kept within substantially its rated value, since overloads on the generator at high speeds result in excessive and destructive sparking at the brushes and coacting commutator, resulting in serious damage to the commutator. At lower speeds, however, a heavier current corresponding to an output greater than the rated output of the generator may be readily commutated and without danger of harming the commutator.

Axle-driven car-lighting systems are subjected to widely varying conditions of use in practice. Thus, for example, in certain cases, as for example on short-haul runs and on runs where relatively high speeds cannot be attained, it is desirable that a large output, and even an overload, of the generator be had at these relatively low speeds, in order to insure reliable and effective lighting service. If, however, the generator regulating apparatus be adjusted for overload outputs at these low speeds, the transfer of the car or train to that class of service where high speeds are consistently attained results in destructive action at the commutator and brushes. In accordance with certain of the features of this invention, the generator is automatically regulated to meet successfully these varying conditions of practical use and their corresponding requirements.

Assuming that the storage battery 14 is in a low state of charge, the regulation of the generator is effected through the lever 26 and its associated coils 28 and 29, it being understood that the voltage coil 22 has its action so adjusted through the spring 21 that it comes into action positively to control the regulation of the generator substantially only when the storage battery 14 attains substantially full charge, it being further understood that as the battery 14 approaches full charge the voltage on the system gradually increases due to the increasing back voltage of the battery. The current coil 28 has its action opposed by the coil 29, the opposing action of the coil 29 varying in accordance with the varying currents through the field winding 11 as determined by the carbon pile 12. Thus, at high speeds the field current is of relatively low value so that the opposing action of the coil 29 is at these high speeds substantially a minimum. The coil 28 and the coil 29 are preferably so proportioned that for this condition of high speed, the output of the generator is substantially normal or equivalent to its rated output. At such a high speed the generator can effectively commutate this load without destructive action at the brushes and commutator.

As the speed of the generator decreases and approaches a lower limit, which may, for example, correspond to a train speed of fifteen miles per hour, the field current necessary to compensate for the decreased speed increases substantially inversely as the speed of the generator decreases. Thus the opposing action of the coil 29 is greatly enhanced at the lower speeds so that the current coil 28 has to carry a greater amount of current to bring about a regulating action. The generator is therefore at these lower speeds regulated for a greater output than normal or than that at which the commutation at the high speeds can take place without damage. The regulating action of the coils 28 and 29 is transmitted, as will be understood from the foregoing, through the bell crank lever 18—19 to the carbon pile 12.

As the battery 14 approaches a state of substantially full charge, the resultant increase in voltage of the system permits the voltage coil 22 to come into action whereupon and ultimately the control of the pressure on the carbon pile 12 is effected through the voltage coil 22 alone. The generator may thus be regulated for substantially constant voltage, the storage battery 14 being floated upon the line and the charging current tapering off to an inappreciable value. Assuming that the generator is thereafter not called upon to supply current to the lamp or other load, the generator will thereafter be regulated at substantially constant voltage irrespective of the speed of the generator and irrespective of the action of the coil 29.

It will thus be seen that there has been provided in this invention a system of regulation in which the several objects of this invention, as well as many advantages, are successfully achieved. The generator, it will be noted, is effectively safeguarded and controlled and is automatically made to adjust itself not only to such conditions of operation as are within its working limits, but also to the varying conditions of practical operation. At high speeds of the generator, when an overload might be harmful, the output may be dependably maintained within the rated capacity of the generator; at slower speeds, when there is no danger of harm to the generator and when an overload is in fact desirable and requisite, the desired overload may be had.

As many possible embodiments may be made of the mechanical features of the above invention and as the art herein described might be varied in various parts, all without departing from the scope of the invention, it is to be understood that all matter herein set forth or shown in the accompanying drawings is to be interpreted as illustrative and not in a limiting sense.

I claim as my invention:

In apparatus of the general nature of that herein described, in combination, a variable speed generator, a storage battery, a variable resistance element in the field circuit of said generator, and means for operating said variable resistance element comprising a pair of coacting levers, one of which is arranged to affect said variable resistance element and the other of which is arranged to act directly upon the first lever, a voltage responsive coil for operating said first-mentioned lever, a current responsive coil for operating said second-mentioned lever, and a coil responsive to a function of the field current of said generator for affecting the action of said current responsive coil.

In testimony whereof, I have signed my name to this specification this third day of May, 1923.

GEORGE E. HULSE.